Dec. 20, 1960

A. Z. CZIPOTT 2,965,301

OHM'S LAW COMPUTER UNIT

Filed March 16, 1955

AKOS Z. CZIPOTT
INVENTOR.

BY [signature]

AGENT

United States Patent Office 2,965,301
Patented Dec. 20, 1960

2,965,301

OHM'S LAW COMPUTER UNIT

Akos Z. Czipott, Alhambra, Calif., assignor, by mesne assignments, to Dresser Industries, Inc., Dallas, Tex., a corporation of Delaware Filed Mar. 16, 1955, Ser. No. 494,766
11 Claims. (Cl. 235—195)

Figure 1:
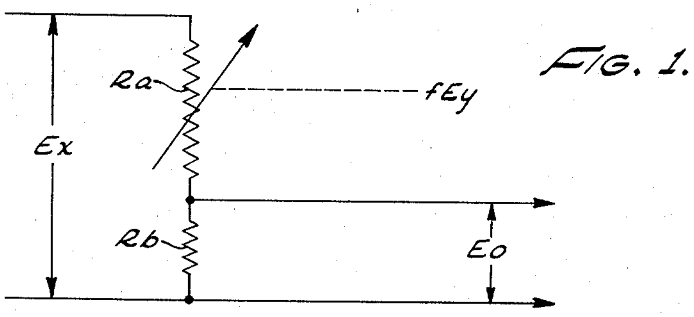

The present invention relates to computer circuitry, and more specifically to a multiplying-dividing circuit based upon Ohm's law relating to electrical circuits.

In the field of automatic computing devices the necessity for means to multiply and to divide is self-evident. In the field of automatic electrical or electronic computers a variety of means for automatically effecting multiplication and/or division have been known. These means include potentiometers, precision variable autotransformers, synchros, condenser voltage dividers, etc. One of the simplest and most reliable of such means is known as the Ohm's law multiplying-dividing circuit, based upon Ohm's law of electrical circuits. In this circuit the series voltage drop across two series-connected resistors is made equal to one input $x$, while the absolute value of one of the combination of resistors is made proportional to another input $y$. The value of the $y$ input to the computer circuit may readily be made variable by making the appropriate one of the resistances variable. In such a circuit the current through the resistances is proportional to $x/y$ and may be measured as a voltage drop across the non-variable one of the two resistances. The minimum usable value of $y$ is proportional to the relative value of the invariable resistance with respect to the other resistance. This multiplying-dividing circuit has, as noted, the good and valuable features of simplicity and reliability; however, it suffers the very serious limitations that it can be used only where the divisor (or multiplier) factor remains either always positive or always negative and does not go to zero. As a consequence of the stated limitations, and probably due to the fact that the majority of applications of multiplier-divider circuits require ability to handle both signs or polarities of multiplier-divisor inputs, the Ohm's law type of multiplier-divider circuit has had only restricted use.

In view of the foregoing statements, it is a primary object of the present invention to provide a means and method of operation which permit employment of the Ohm's law type of multiplier-divider circuit in applications wherein the sign (polarity or phase) of both of the input factors ($x$ and $y$, for example) may reverse during the operation, wether those factors in a given case are represented by alternating (A.C) or direct (D.C.) current or voltage.

Another object of the invention is the provision of a simple and reliable multiplier-divider computer unit of increased capacity.

Another object of the invention is the provision of a simple and reliable D.C. multiplier-divider computer unit.

Another object of the invention is the provision of a simple and reliable A.C. multiplier-divider computer unit.

Figure 2:
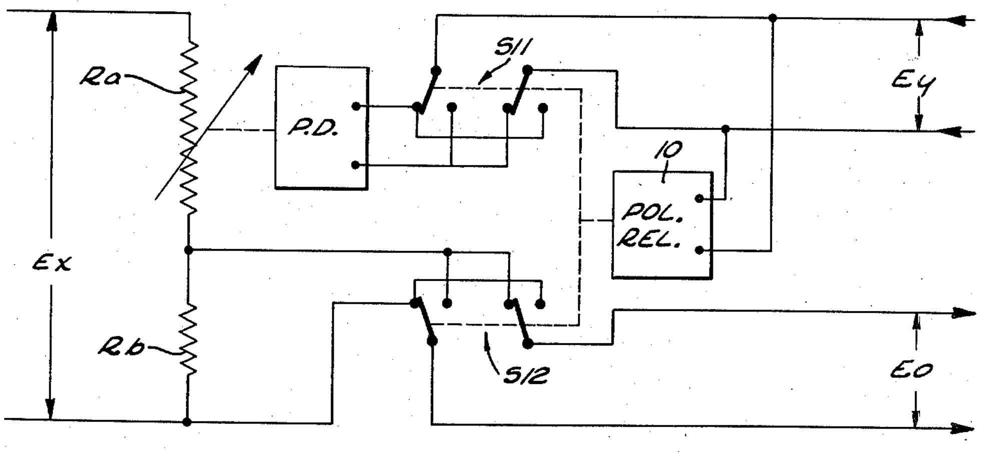
Figure 3:
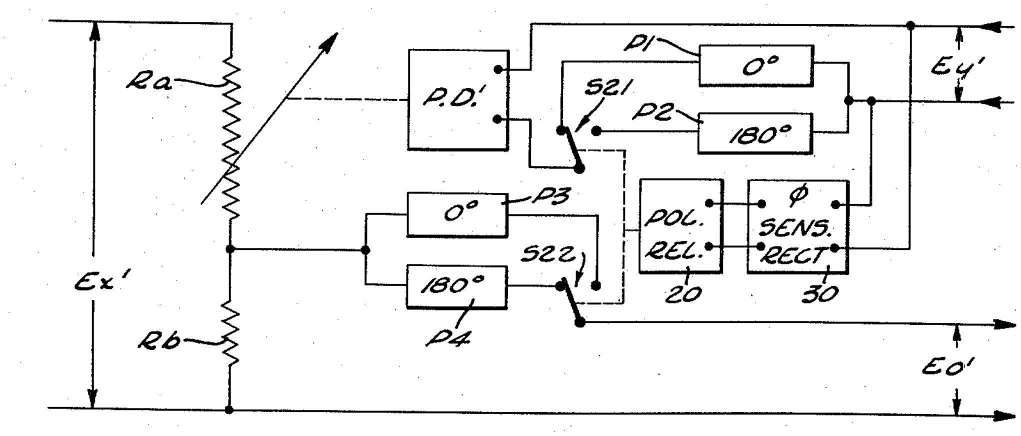

Other objects and advantages of the present invention will hereinafter be made apparent in connection with the following description and explanation of a preferred form of apparatus according to the invention and schematically illustrated in the accompanying drawings, in which like or similar elements bear like reference characters and in which:

Figure 1 is a schematic diagram of a simple form of Ohm's law type multiplier-divider computer circuit;

Figure 2 is a schematic diagram of a simple form of Ohm's law multiplier-divider unit comprising improvements according to the present invention and more specifically adapted to handle D.C. electrical quantities; and Figure 3 is a schematic diagram of a simple form of Ohm's law multiplier-divider unit comprising improvements according to the present invention and more particularly adapted to handle computations involving factors or numbers represented by A.C. quantities.

The apparatus employed in the preferred form of the invention is shown only schematically in the drawings since the actual physical components may be any suitable units chosen from a wide variety of commercially available types or forms, and since any particular choice or selection of a certain type of component will be largely governed by design considerations in any case. Selection of any specific type or form of components is not necessary to a full understanding of the invention.

Referring now to Figure 1, there is depicted in schematic form an ohmic circuit means comprising a first resistance R$a$ of adjustable value, electrically connected in series with a second resistance R$b$ of fixed value. R$a$ may be in the form of a potentiometer having means, such as a shaft, for adjustment purposes, and connected as a variable resistor, as is common and well known. Conductors, as indicated, are connected to the resistors for application thereto of factor-representing voltages and/or currents and for deriving therefrom an output, all as more fully explained hereinafter. If a voltage E$x$ is applied as indicated across the resistances in series, as one of the inputs, a current I flows through the resistances. Now, if an output is derived in the nature of the potential across R$b$, and termed E$o$, the relationships:

$$Ex=I(Ra+Rb),\text{ or, } I=Ex/(Ra+Rb)$$

and $$Eo=IRb,\text{ or, } I=Eo/Rb,\text{ obtain}$$

so $$Eo=Ex(Rb)/(Ra+Rb)$$

Now if $Ra+Rb$ is made equal to C$m$Ey where C$m$ is a constant, then $$Eo=\frac{Fx(Rb)}{Cm(Ey)}$$

whereby, if $Rb/Cm=Ka$ $$Eo=\frac{Fx}{Ey}(Ka)$$

or E$o$ is proportional to the quotient of E$x$ divided by E$y$.

Similarly, if $Ra+Rb$ is made equal to $Cn/Ey$, where C$n$ is a constant, $$Eo=\frac{(Ex)(Rb)}{(Cn/Ey)}$$

or $Eo=ExEyRb/Cn$, so that if $Rb/Cn=Kb$, then $$Eo=ExEyRb/Cn$$

or, $Eo$ is proportional to the product of E$x$ and E$y$.

In practice, in the case of a multiplying operation, $Ra+Rb$ may be made substantially proportional to E$y$ by using as R$a$ a linear potentiometer and driving the potentiometer directly in proportion to the absolute value of E$y$ independent of sign thereof; and in the case of division operations, $Ra+Rb$ may be made substantially inversely proportional to E$y$ independent of sign thereof by letting the resistance increase as the angle of rotation of the potentiometer decreases with decreasing E$y$; it being understood that the accuracy of the proportionality is dependent upon the relative values of R$a$ and R$b$ at a given setting of R$a$.

It is evident that $Ra+Rb$ msut be made proportional (or inversely proportional, in the case of division) to the absolute value of E$y$ if the circuit is to be operative for either sign (phase or polarity) of E$y$. Thus, previously, the Ohm's law computer circuit was used only when E$y$ did not change sign during any phase of the operations. By means of the present invention the circuit is enabled to perform with E$y$ of either, or of changing, sign.

In accordance with the invention, the sign of the E$y$ input to the potentiometer driving means is corrected at the moment E$y$ changes sign so that $Ra+Rb$ will be proportional to the absolute value of E$y$. Simultaneously, the sign of the output E$o$ is reversed to obta'n the correct sign of the computed quantity. It is evident that if the sign of E$x$ changes, the sign of output E$o$ automatically changes with the change in E$x$, so no correction is required in that case.

Referring now to Figure 2, resistances R$a$ and R$b$ are arranged with associated conductors to form an Ohm's law circuit as in Figure 1. The value of R$a$ is varied by means of apparatus designated P.D., meaning potentiometer drive, which drives the potentiometer selectively either in proportion to the absolute value of E$y$, or in inverse proportion to such absolute value as required, the potentiometer being in this case linear. The input potential supplied to the potentiometer drive unit is potential E$y$ with sign or polarity made not effective by means of a first reversing switch S11 of a polarized relay 10. The polarized relay has its input connected, as indicated, to the conductors supplying potential E$y$, whereby the relay is operated to correct the sign or polarity of the input to the potentiometer drive as soon as the sign or polarity of E$y$ changes, whereby the potentiometer drive does not sense the sign of E$y$, but senses only the absolute value of E$y$. A second reversing switch S12, forming a part of the contact system of relay 10, is connected as indicated to the output leads supplying output potential E$o$ from resistance R$b$ of the Ohm's law circuit, so that, simultaneously with reversal of sign or polarity of E$y$ and operation of switch S11, the sign or polarity of E$o$ will be correctly obtained. Thus the arrangement is such that the operations $X/Y$ and X(Y) may be performed by the circuit irrespective of change of sign or polarity of Y; it being understood that X is the number or factor represented by E$x$ and Y is the factor represented by E$y$.

Referring to Figure 3, if it is desired to operate the Ohm's law computer unit with A.C. quantities. it is necessary to reverse the phase of the input to the potentiometer drive means where the sign of the "y" input, E$y'$ changes, and it also is necessary to similarly reverse the phase of the output potential E$o'$ at the same time. In the manner analogous to that hereinabove described in connection with the D.C. circuitry of Figure 2, a polarized relay 20 is arranged to operate its two switches S21 and S22 as soon as the sign of input Y', that is, E$y'$, reverses. To this end potential E$y'$ is supplied to a phase sensitive rectifier 30 whose output is D.C. of polarity dependent upon the phase of the A.C. input. Thus, when E$y'$ changes sign, the output of rectifier 30 will reverse in polarity and as a consequence relay 20 will operate its switches S21 and S22. Switches S21 and S22 are connected, as indicated, to reverse the phase of the input to the potentiometer drive and of the output potential derived across R$b$, when relay 20 operates. Thus one lead of input E$y'$ is connected directly to a terminal of the potentiometer drive unit P.D.' while the other lead is connected to 0° and 180° phase-shifting units P1 and P2, the other terminals of which are connected to poles of switch S21 for selective connection to the other terminal of unit P.D.' as indicated. Also, one lead of the output circuit for the quantity E$o'$ is connected to the lower end of resistance R$b$, and the other lead is connected to switch S22 for selective connection to one or the other of 0° and 180° phase shifting units P3 and P4, the other connections of which are connected to the upper end of resistance R$b$.

From the preceding description of the circuitry and means depicted in Figure 3 it is evident that when the sign of the input quantity represented by E$y'$ changes, the change is instantly sensed by phase sensitive rectifier 30 and polarized relay 20 operated to reverse the phase of the input to the potentiometer drive, and also to maintain the correct sign of the output quantity E$o'$.

While the inherent limitation of all Ohm's law computer circuits in regard to fundamental accuracy limitations and to nonoperability below a certain value of multiplier or divider (E$y$) remains, it is seen that the present invention provides a computer unit which is capable of multiplying or dividing numerical factors represented by respective electrical quantities when the signs (polarity or phase) of either one or both of the input factors changes or reverses, with automatic correction of the sign of the output factor (product or quotient), or output electrical quantity.

From the previous description it is seen that the invention provides, for an Ohm's law computer circuit in which either or both of the input factors may change sign, an operating means arranged to receive or have applied thereto the absolute value of the second input factor and to act in response thereto to vary the variable resistance in proportion to (or inversely proportional to, in the case of division) the absolute value of the second input factor, and means sensitive to change of sign of the second input factor to concurrently change the sign of the output factor to correct the latter, and to correct the sign of the second input factor as received or applied to the operating means whereby the latter is rendered immune to the sign of the second input factor and is governed solely by the absolute value of the second input factor.

It is evident that modifications of the apparatus and circuitry will by the disclosure be suggested to those skilled in the art; and accordingly I do not wish to be limited to the specific details of the disclosed embodiments of the invention, but what I claim is:

1. Electrical means for multiplying or dividing first and second factors represented, respectively, by first and second electrical input quantities, either of which is subject to change of sign during the computation process, comprising: ohmic means including first and second series-connected resistances the first of which is variable; means connecting the first electrical input quanti'y across said ohmic means; operating means receiving said second electrical input quantity and effective to vary said first resistance in accordance with the absolute value and sign of said second electrical input quantity; means for receiving the resultant output electrical quantity representing the product or quotient factor of said first and second quantities, from across the second of said resistances; and means sensitive to the sign of said second electrical quantity and responsive to change of sign thereof for concurrently with such change changing the sign of the thus received resultant output electrical quantity and that of the second electrical input quantity as received by said operating means, to apply the correct sign to said output electrical quantity.

2. An Ohm's law computer unit comprising: first and second series-connected resistances, the first of which is variable; means to apply a first electrical input quantity across the series-connected resistances; operating means to vary said first resistance directly in accordance with the absolute value, independent of sign, of a second electrical input quantity applied thereto; means for obtaining the resultant electrical output quantity from across the second of said resistances; and means sensitive to the sign of said second electrical input quantity and responsive to reversal thereof simultaneously to reverse the sign of said resultant electrical output quantity thus obtained to produce therefrom a final electrical output quantity (of correct sign) representing the product, including the resultant sign thereof, of the said first electrical input quantity and said second electrical input quantity.

3. Electrical means in accordance with claim 2 in which said electrical quantities and signs thereof are unidirectional electric potentials and the polarities thereof respectively.

4. An Ohm's law computer unit comprising: first and second series-connected resistances, the first of which is variable; means to apply a first electrical input quantity across the series-connected resistances; operating means to vary said first resistance inversely in accordance with the absolute value, independent of sign, of a second electrical input quantity applied thereto; means for obtaining the resultant electrical output quantity from across the second of said resistances; and means sensitive to the sign of said second electrical input quantity and responsive to reversal thereof simultaneously to reverse the sign of said resultant electrical output quantity thus obtained, to produce therefrom a final electrical output quantity representing the quotient, including the resultant sign thereof, the said first electrical input quantity and said second electrical input quantity.

5. Electrical means in accordance with claim 4 in which said electrical quantities and signs thereof are unidirectional electric potentials and the polarities thereof respectively.

6. Electrical means for multiplying first and second electrical factors represented, respectively, by first and second electrical input quantities, either of which factors is subject to change of sign in the computation process comprising: ohmic means including first and second series-connected resistances, the first of which resistance is variable; means connecting the first electrical input quantity across said ohmic means; operating means receiving said second electrical input quantity and effective to vary said first resistance directly in proportion to the absolute value and sign of said second electrical input quantity; means for receiving the resultant output electrical quantity representing the product of said first and second quantities, from across the second of said resistances; and means sensitive to the sign of said second electrical input quantity and responsive to change of sign thereof for concurrently with such change changing the sign of the thus received resultant output electrical quantity and that of the second electrical input quantity as received by said operating means, to produce therefrom a final electrical output quantity representing the product, including the resultant sign thereof, of the said first electrical input quantity and said second input electrical quantity.

7. Electrical means in accordance with claim 6 in which said electrical quantities and signs thereof are unidirectional electric potentials and the polarities thereof respectively.

8. Electrical means for obtaining the quotient of first and second factors represented, respectively, by first and second electrical input quantities, either of which factors is subject to change of sign in the computation process comprising: ohmic means including first and second series-connected resistances, the first of which resistance is variable; means connecting the first electrical input quantity across said ohmic means; operating means receiving said second electrical input quantity and effective to vary said first resistance inversely proportional to the absolute value and directly as the sign of said second electrical input quantity; means for receiving the resultant output electrical quantity representing the quotient of said first and second quantities from across the second of said resistances; and means sensitive to the sign of said second electrical quantity and responsive to change of sign thereof for concurrently with such change changing the sign of the thus received resultant output electrical quantity and that of the second electrical input quantity as received by said operating means, to produce therefrom a final electrical output quantity representing the quotient, including the resultant sign thereof, of the said first electrical input quantity and said second electrical input quantity.

9. Electrical means in accordance with claim 8 in which said electrical quantities and signs thereof are unidirectional electric potentials and the polarities thereof respectively.

10. Electrical means for multiplying first and second factors represented, respectively, by first and second A.-C. electrical input signals, either of which factors is subject to change in both value and sign during the computation process, and in which such value is represented by a function of the amplitude of such signals and the sign is represented by the phase thereof with respect to a predetermined standard comprising: impedance means including first and second series-connected impedances, the first of which is variable; means connecting the first A.-C. electrical input signal across said impedance means; operating means receiving said second A.-C. electrical input signal and effective to vary said first impedance directly proportional to the value of said second A.-C. electrical input signal; means for receiving the resultant output A.-C. electrical signal representing the product of the values of said first and second factors, from across the second of said impedances; and means sensitive to the phase relationship of said second A.-C. electrical signal with respect to said predetermined standard and responsive to a 180° shift therein with respect to said standard for, concurrently with such shift, shifting the sign of the said received resultant A.-C. output electrical signal 180° to produce therefrom a final A.-C. electrical output signal representing the product, including the correct resultant sign thereof, of the said first factor and said second factor.

11. Electrical means for obtaining the quotient of first and second factors represented, respectively, by first and second A.-C. electrical input signals, either of which factors is subject to change of sign and value during the computation process, and in which such value is represented by a function of the amplitude of such signals and the sign is represented by the phase thereof with respect to a predetermined standard, comprising: impedance means including first and second series-connected impedances, the first of which is variable; means connecting the first A.-C. electrical input quantity across said impedance means; operating means receiving said second A.-C. electrical input signal and effective to vary said first impedance inversely proportional to the value of said second A.-C. electrical input signal; means for receiving the resultant output A.-C. electrical signal representing the quotient of said first and second factors, from across the second of said impedances; and means sensitive to the phase relationship of said second A.-C. electrical signal with respect to said predetermined standard and responsive to a 180° shift in phase thereof for, concurrently with such shift, shifting the phase of the thus received resultant output A.-C. electrical signal 180°, to produce therefrom a final A.-C. electrical output signal representing the quotient, including the correct resultant sign thereof of said first and second factors.

References Cited in the file of this patent

"Electronic Analog Computers" (Korn and Korn), published by McGraw-Hill Book Company, Inc., New York-Toronto-London, 1952, page 212 of interest.

Analog Methods in Computation and Simulation (Soroka), published by McGraw-Hill Book Company, Inc., New York-Toronto-London, 1954, pages relied on 71–75.

UNITED STATES PATENT OFFICE

CERTIFICATION OF CORRECTION

Patent No. 2,965,301 December 20, 1960

Akos Z. Czipott

It is hereby certified that error appears in the above numbered patent requiring correction and that the said Letters Patent should read as corrected below.

Column 2, line 59, for "Eo=ExEyRb/Cn" read -- Eo=ExEyKb --.

Signed and sealed this 1st day of August 1961.

(SEAL)
Attest:

ERNEST W. SWIDER
Attesting Officer

DAVID L. LADD
Commissioner of Patents